(12) United States Patent
Zhang et al.

(10) Patent No.: US 10,704,886 B2
(45) Date of Patent: Jul. 7, 2020

(54) CURVATURE MEASUREMENT APPARATUS

(71) Applicant: Siemens Aktiengesellschaft, Munich (CN)

(72) Inventors: Chuan Yu Zhang, Beijing (CN); Yue Zhuo, Beijing (CN); Dong Li, Beijing (CN); Rui Gong Zhang, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/145,793

(22) Filed: Sep. 28, 2018

(65) Prior Publication Data

US 2019/0128658 A1 May 2, 2019

(30) Foreign Application Priority Data

Sep. 29, 2017 (CN) .......................... 2017 1 0911449

(51) Int. Cl.
*G01B 7/287* (2006.01)
*G06F 3/01* (2006.01)
(Continued)

(52) U.S. Cl.
CPC ............... *G01B 7/287* (2013.01); *G01B 7/18* (2013.01); *G01B 21/32* (2013.01); *G06F 3/014* (2013.01)

(58) Field of Classification Search
CPC .......... G01B 7/28; G01B 7/281; G01B 7/287; G01B 7/18; G06F 3/014; A61B 5/103
See application file for complete search history.

(56) References Cited

U.S. PATENT DOCUMENTS 5,652,395 A 7/1997 Hirano et al.
2006/0248478 A1 11/2006 Liau
(Continued)

FOREIGN PATENT DOCUMENTS

CN 101534699 A 9/2009
CN 105371785 A 3/2016
(Continued)

OTHER PUBLICATIONS

Zhong Shen et al: "A soft stretchable bending sensor and data glove applications", Robotics and Biomimetics, vol. 3. No. 1, Dec. 1, 2016 (Dec. 1, 2016), XP055543610, DOI: 10.1186/s40638-016-0051-1; 2016.
(Continued)

*Primary Examiner* — Tom V Sheng
(74) *Attorney, Agent, or Firm* — Harness, Dickey & Pierce, P.L.C.

(57) ABSTRACT

An embodiment relates to a curvature measurement apparatus. The apparatus includes a first curvature measurement unit configured to, upon a curvature of an object to be measured being relatively greater than a first curvature, measure the curvature of the object to be measured; and a second curvature measurement unit configured to, upon the curvature of the object to be measured being relatively smaller than a second curvature, measure the curvature of the object to be measured, the second curvature being relatively greater than or equal to the first curvature. The curvature measurement apparatus can improve an accuracy of a curvature of an object to be measured.

12 Claims, 6 Drawing Sheets

(51) Int. Cl.
*G01B 21/32* (2006.01)
*G01B 7/16* (2006.01)

(56) References Cited

U.S. PATENT DOCUMENTS

| | | | | |
|---|---|---|---|---|
| 2008/0189827 A1* | 8/2008 | Bauer | ............... | A61B 5/225 2/161.2 |
| 2008/0221484 A1* | 9/2008 | Sarvazyan | ............ | A61B 5/103 600/587 |
| 2011/0134034 A1* | 6/2011 | Daniel | ............... | A63F 13/06 345/158 |
| 2013/0093665 A1* | 4/2013 | Han | ............... | G06F 3/011 345/156 |
| 2013/0312541 A1* | 11/2013 | Majidi | ............ | G01B 7/18 73/862.454 |
| 2013/0335311 A1* | 12/2013 | Kim | ............... | G06F 3/01 345/156 |
| 2014/0035869 A1* | 2/2014 | Yun | ............... | G06F 3/0414 345/174 |
| 2014/0125577 A1* | 5/2014 | Hoang | ............ | G06F 3/017 345/156 |
| 2015/0227245 A1* | 8/2015 | Inagaki | ............ | G06F 3/0412 345/173 |
| 2015/0301606 A1* | 10/2015 | Andrei | ............... | G06F 3/017 345/156 |
| 2015/0301608 A1* | 10/2015 | Nagaraju | ............ | G06F 3/0488 345/156 |
| 2016/0049227 A1* | 2/2016 | Bottiglio | ............ | G01L 1/005 73/763 |
| 2016/0250015 A1* | 9/2016 | Kim | ............... | A61F 2/105 623/15.12 |
| 2016/0278665 A1* | 9/2016 | Ferreira | ............... | A61B 5/0053 |
| 2016/0313798 A1* | 10/2016 | Connor | ............... | G06F 3/017 |
| 2017/0172421 A1* | 6/2017 | Dabby | ............... | A61B 5/0205 |
| 2017/0176167 A1* | 6/2017 | Keller | ............... | G01B 7/18 |
| 2017/0176267 A1* | 6/2017 | Keller | ............... | G06F 3/014 |
| 2017/0215768 A1* | 8/2017 | Belfiori | ............... | G06F 1/163 |

FOREIGN PATENT DOCUMENTS

| | | |
|---|---|---|
| CN | 105512370 A | 4/2016 |
| CN | 105783745 A | 7/2016 |
| CN | 107077207 A | 8/2017 |
| EP | 3098691 A1 | 11/2016 |
| JP | S63201543 A | 8/1988 |
| JP | S63277945 A | 11/1988 |
| JP | H01291296 A | 11/1989 |
| JP | H04233442 A | 8/1992 |
| JP | H05341785 A | 12/1993 |
| JP | H0919422 A | 1/1997 |
| WO | WO-2005010460 A1 | 2/2005 |

OTHER PUBLICATIONS

Extended European Search Report dated Jan. 29, 2019.
Japanese Office Action and English translation thereof dated Aug. 9, 2019.
Di Hai-Ting et al: "Three dimensional reconstruction of curved shape based on curvature fiber optic sensor"; Optics and Precision Engineering; vol. 18; No. 5; May 2010; pp. 1092-1098; DOI 10.3788/OPE. 201010805.1092; 2010.
Office Action for Chinese Patent Application No. 201710911449.7 dated Apr. 2, 2020.

* cited by examiner

CURVATURE MEASUREMENT APPARATUS

PRIORITY STATEMENT

The present application hereby claims priority under 35 U.S.C. § 119 to Chinese patent application number CN201710911449.7 filed Sep. 29, 2017, the entire contents of which are hereby incorporated herein by reference.

FIELD

Embodiments of the present invention generally relate to a curvature measurement apparatus.

BACKGROUND ART

In man-machine interaction scenarios, robots are usually expected to follow human gestures. In order to achieve this function, it is important to accurately measure the curving flexure (also known as curvature) of a person's finger. At present, many types of sensors are used to measure a curvature of a finger of a person. When a curvature of a finger of a person is large, these sensors can accurately measure the curvature of the finger. However, when the curvature of a finger of a person is small, these sensors usually fail to accurately measure the curvature of the finger. Thus, using existing sensors does not always accurately measure the curvature of a finger of a person.

SUMMARY

In view of the above problem of the prior art, embodiments of the present invention provide a curvature measurement apparatus which can improve the accuracy of measuring a curvature of an object to be measured.

A curvature measurement apparatus according to an embodiment of the present invention comprises:

a first curvature measurement unit configured to, upon a curvature of an object to be measured being relatively greater than a first curvature, measure the curvature of the object to be measured; and a second curvature measurement unit configured to, upon the curvature of the object to be measured being relatively smaller than a second curvature, measure the curvature of the object to be measured, wherein the second curvature is relatively greater than or equal to the first curvature.

A curvature measurement apparatus according to an embodiment of the present invention comprises a first curvature measurement unit, configured to, when a curvature of an object to be measured is greater than a first curvature, measure the curvature of the object to be measured; and a second curvature measurement unit, configured to, when the curvature of the object to be measured is smaller than a second curvature, measure the curvature of the object to be measured, wherein the second curvature is greater than or equal to the first curvature.

In another embodiment, the first curvature measurement unit comprises: a resistive strain gauge sensor; the resistive strain gauge sensor is configured to have a shape extending along the object to be measured, and when the curvature of the object to be measured is greater than the first curvature, the resistive strain gauge sensor bends as the object to be measured bends, to change a resistance of the resistive strain gauge sensor; and a first curvature calculation unit, configured to calculate the curvature of the resistive strain gauge sensor according to the resistance of the resistive strain gauge sensor, to use the curvature as the curvature of the object to be measured.

In another embodiment, the second curvature measurement unit comprises: a pressure sensor; the pressure sensor is configured to come into contact with the object to be measured, and when the curvature of the object to be measured is smaller than the second curvature, the pressure sensor senses a pressure applied by the object to be measured to the pressure sensor as the object to be measured bends; and a second curvature calculation unit, configured to calculate the curvature of the object to be measured according to the pressure sensed by the pressure sensor.

In another embodiment, the apparatus further comprises: an elastic component, configured to have an original shape extending along the object to be measured and bending by a preset curvature; the pressure sensor is disposed in a direction in which the object to be measured bends, and when the elastic component bends and changes the original shape as the object to be measured bends, the elastic component applies an elastic force to the object to be measured, so that the object to be measured applies to the pressure sensor a force corresponding to the elastic force applied by the elastic component.

In another embodiment, the first curvature calculation unit calculates a curvature of the resistive strain gauge sensor according to a first relationship curve according to which the resistance of the resistive strain gauge sensor changes as the curvature changes; and the resistive strain gauge sensor is configured to cause a portion that is of the first relationship curve and that corresponds to the curvature of the resistive strain gauge sensor greater than the first curvature to be linear.

In another embodiment, the second curvature calculation unit calculates a curvature of the elastic component according to a second relationship curve according to which the pressure sensed by the pressure sensor changes as the curvature of the elastic component changes, to use the curvature as the curvature of the object to be measured; and the elastic component is configured to cause a portion that is of the second relationship curve and that corresponds to the curvature of the elastic component smaller than the second curvature to be linear.

In another embodiment, the preset curvature is the second curvature.

In another embodiment, the object to be measured is a finger of a person, and the apparatus further comprises: a sheath body, configured to be worn on the finger, wherein the first curvature measurement unit and the second curvature measurement unit are disposed in the sheath body.

In another embodiment, a curvature measurement method, comprising:

comparing a curvature of an object to be measured to a first curvature;

measuring the curvature of the object upon the curvature of the object being relatively greater than the first curvature;

comparing the curvature of the object to be measured to a second curvature, the second curvature being relatively greater than or equal to the first curvature; and measuring the curvature of the object upon the curvature of the object being relatively smaller than the second curvature.

In another embodiment, the comparing of the curvature of the object to be measured to the first curvature comprises:

changing a resistance bending a sensor having a shape extending along the object to be measured, as the object to be measured bends, upon the curvature of the object to be measured being relatively greater than the first curvature; and calculating a curvature of the sensor, according to the resistance of the resistive strain gauge sensor as changed, the curvature calculated being the curvature of the object measured.

In another embodiment, the comparing of the curvature of the object to be measured to the second curvature comprises:

sensing a pressure via a pressure sensor, upon the curvature of the object to be measured being relatively smaller than the second curvature, applied to the pressure sensor as the object to be measured bends; and measuring the curvature of the object to be measured according to the pressure sensed by the pressure sensor.

BRIEF DESCRIPTION OF THE DRAWINGS

Other features, characteristics, advantages and benefits of embodiments of the present invention will become more apparent by the following detailed description in conjunction with the accompanying drawings.

Figure 1A:
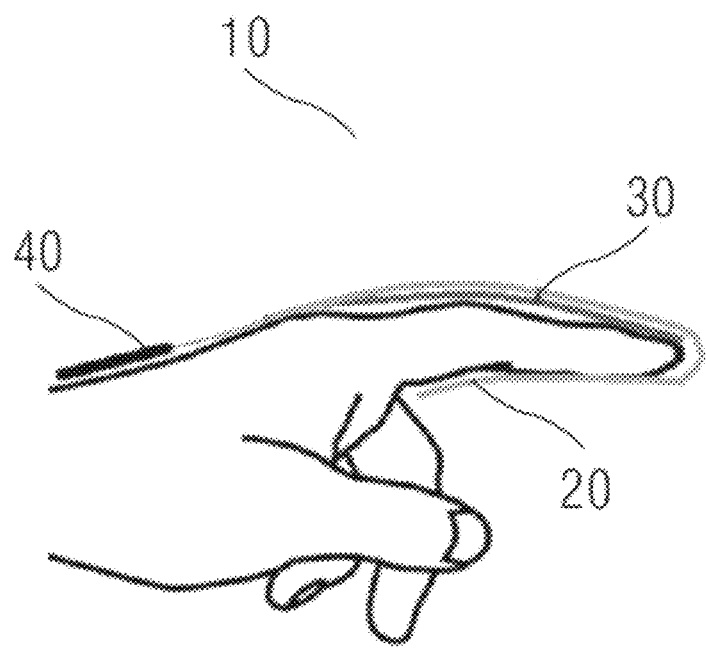
FIG. 1A shows a schematic diagram of an apparatus for measuring a curvature of an object according to one embodiment of the present invention.

| Reference Numerals | | | |
|---|---|---|---|
| 10: | Curvature measurement apparatus | 20: | Finger sheath |
| 30: | Sensing apparatus | 32: | Resistive strain gauge sensor |
| 34: | Pressure sensor | 36: | Elastic metal body |
| 40: | Controller | 200: | Method for measuring a curvature of an object |
| 202: | Instruct to start a calibration operation. | 204: | Calculate the maximum curvature of the finger. |
| 206: | Calculate the minimum curvature of the finger. | 208: | Output the maximum and minimum curvatures. |
| 210: | Calculate a curvature of the finger. | 212: | Output a curvature of the finger. |
| 300: | Curvature measurement apparatus | 302: | First curvature measurement unit |
| 304: | Second curvature measurement unit | 306: | Metal component |
| 308: | Sheath body | 3022: | Resistive strain gauge sensor |
| 3024: | First curvature calculation unit | 3042: | First curvature calculation unit |
| 3044: | Second curvature calculation unit | | |

DETAILED DESCRIPTION OF EXAMPLE EMBODIMENTS

In the following, embodiments of the invention are described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scale with each other. Rather, the representation of the various elements is chosen such that their function and general purpose become apparent to a person skilled in the art.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

A solution of an embodiment of the present invention uses a sensing apparatus comprising a plurality of sensors to measure a curvature of an object and combines the sensor outputs of the plurality of sensors to calculate the curvature of the object, wherein the plurality of sensors comprise at least one sensor capable of linearly converting a curvature of the object into a sensor output in a curvature change interval larger than the first curvature of the object, and at least one sensor capable of linearly converting a curvature of the object into a sensor output in a curvature change interval from a zero curvature to a second curvature not smaller than the first curvature of the object. The sensor capable of linearly converting a curvature of the object into a sensor output in a curvature change interval larger than the first curvature of the object can accurately measure the curvature of the object when the curvature of the object is large; the sensor capable of linearly converting a curvature of the object into a sensor output in a curvature change interval from a zero curvature to a second curvature of the object can accurately measure the curvature of the object when the curvature of the object is small. Therefore, the solution of an embodiment of the present invention always allows accurate measurement of a curvature of an object when the curvature of the object is small or large. Thus, compared with the prior art, the solution of an embodiment of the present invention improves the accuracy of measuring a curvature of an object.

Various embodiments of the present invention will be described below in detail with reference to the accompanying drawings.

In reference to FIG. 1A, said figure shows a general schematic diagram of a curvature measurement apparatus according to an embodiment of the present invention. In this embodiment, the object whose curvature is measured is a finger of a person.

As shown in FIG. 1A, the curvature measurement apparatus 10 may comprise a plurality of finger sheaths 20, a plurality of sensing apparatuses 30, and a controller 40.

The finger sheath 20 is a long strip of sheath that wraps an entire finger and clings to the finger, with an opening at one end so that a finger can reach inside the finger sheath 20.

The finger sheath 20 is made of flexible materials (including, but not limited to, natural latex or polyurethane materials), so that the finger sheath 20 can be worn on a finger and can freely bend with the finger. A sensing apparatus 30 is attached to the inner wall of each finger sheath 20. When each finger sheath 20 to which a sensing apparatus 30 is attached is worn on one finger, the position of the finger sheath 20 relative to the finger is adjusted so that the sensing apparatus 30 is located on and pressed against the nail-bearing side of the finger (hereinafter referred to as the back of the finger), so that the sensing apparatus 30 can sense subtle gesture changes of the finger so as to accurately measure the curvature of the finger. Here, a finger wearing a finger sheath 20 is referred to as the finger to which the sensing apparatus 30 attached to the finger sheath 20 is directed.

Figure 1B:
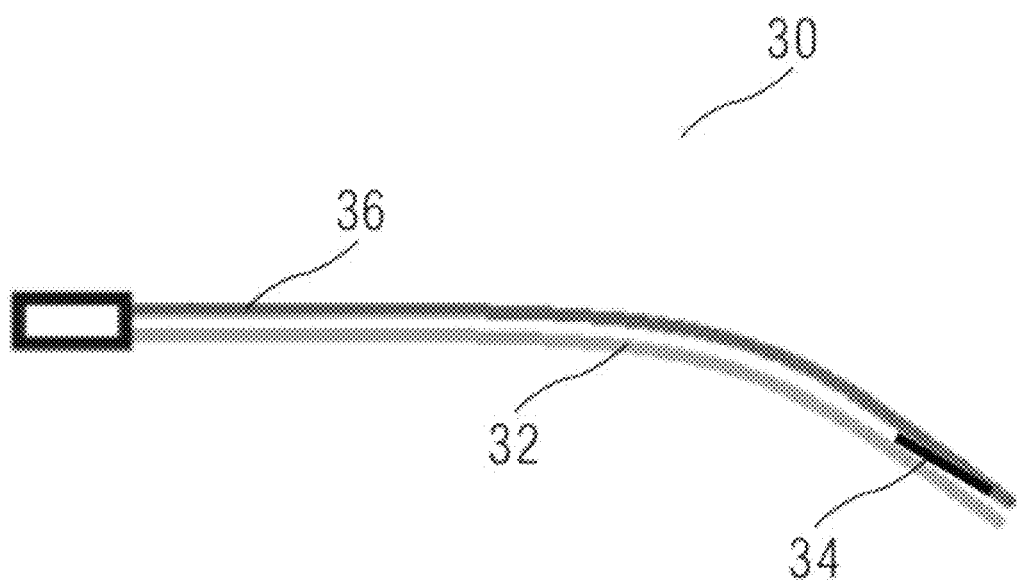
FIG. 1B shows a schematic diagram of a sensing apparatus according to an embodiment of the present invention.

As shown in FIG. 1B, each sensing apparatus 30 comprises a resistive strain gauge sensor 32, a pressure sensor 34, and an elastic metal body 36.

The resistive strain gauge sensor 32 is a long strip with a length equal to or slightly greater than the length of the finger to which the sensor 30 is directed. When the finger sheath 20 attached to the sensing apparatus 30 is worn on a finger, the long strip direction of the resistive strain gauge sensor 32 in the sensing apparatus 30 is parallel to the direction of the finger from the finger root to the finger tip, and the resistive strain gauge sensor 32 covers, in its long strip direction, the back of the finger along the finger root to the finger tip. The resistive strain gauge sensor 32 is a sensor which transforms strain into a resistance change by using a resistive strain gauge, composed of a resistive strain sensor pasted on an elastic element. When a physical quantity, for example, force, torque, velocity, acceleration or flow, is applied to the elastic element of the resistive strain gauge sensor 32, the elastic element deforms. The deformation of the elastic element then causes a resistance change in the resistive strain gauge in the resistive strain gauge sensor 32. The resistive strain gauge sensor 32 converts the resistance change in the resistive strain gauge into an electrical signal value through a conversion circuit provided in the sensor and outputs the electrical signal value as a sensor output. The resistive strain gauge sensor 32 can be any existing type of resistive strain gauge sensor, for example, an XHZ-210/215 resistive strain gauge sensor manufactured by Changsha Xianghao Electronic Technology Co., Ltd.

The elastic metal body 36 is in the shape of a long strip, and has a length basically the same as that of the resistive strain gauge sensor 32. The elastic metal body 36 can be bonded with or separated from the resistive strain gauge sensor 32. The elastic metal body 36 can be made of any metal having good elasticity. The long elastic metal body 36 is bent in a natural state and has a preset curvature of ANG1. When the finger sheath 20 to which the sensing apparatus 30 is attached is worn on a finger, the long strip direction of the elastic metal body 36 in the sensing apparatus 30 is parallel to the direction of the finger from the finger root to the fingertip, and the elastic metal body 36 covers, in its long strip direction, the back of the finger along the finger root to the finger tip. The bending portion of the elastic metal body 36 is located on the finger portion where the finger tip of the finger is located.

The pressure sensor 34 is located on the side of the bent end of the elastic metal body 36 that is to press against the finger so that it is also located on the finger portion where the finger tip is located.

Figure 1C:
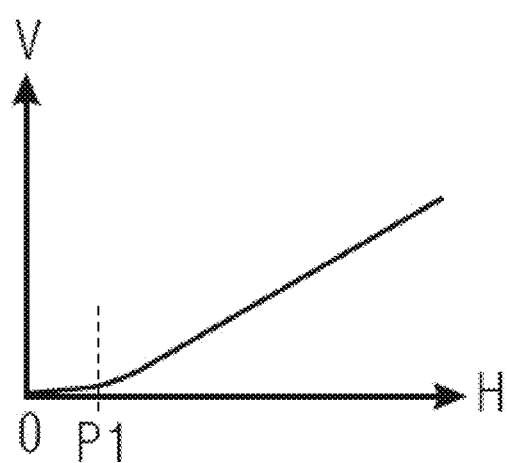
FIG. 1C shows an example of the output characteristics of a resistive strain gauge sensor.

For the resistive strain gauge sensor 32, the deformation of the elastic element in the resistive strain gauge sensor 32 increases gradually from zero as the curvature of the resistive strain gauge sensor 32 increases gradually from zero. Accordingly, the resistance change of the resistive strain gauge in the resistive strain gauge sensor 32 increases gradually from zero, and the sensor output indicating the electrical signal value of the resistive strain gauge sensor 32 also increases gradually from zero. FIG. 1C shows an example of the output characteristics of the resistive strain gauge sensor 32, wherein the vertical axis V represents the sensor output of the resistive strain gauge sensor 32 and the horizontal axis H represents the curvature of the resistive strain gauge sensor 32. As can be seen from FIG. 1C, in the curvature change interval from zero to curvature P1 of the resistive strain gauge sensor 32, the sensor output of resistive strain gauge sensor 32 does not increase linearly with the curvature of the resistive strain gauge sensor 32, and the relationship between sensor output and curvature of the resistive strain gauge sensor 32 is nonlinear.

In contrast, in the curvature change interval of the resistive strain gauge sensor 32 larger than curvature P1, the sensor output of the resistive strain gauge sensor 32 increases linearly with the curvature of the resistive strain gauge sensor 32, and the relationship between sensor output and curvature of the resistive strain gauge sensor 32 is linear. It can be seen that when the curvature of the resistive strain gauge sensor 32 is large (for example, greater than P1), the relationship between sensor output and curvature of the resistive strain gauge sensor 32 is linear. This means that the resistive strain gauge sensor 32 can linearly convert its curvature to a sensor output, so that the resistive strain gauge sensor 32 can accurately measure the curvature of a finger bent with the resistive strain gauge sensor 32.

For the pressure sensor 34, when the elastic metal body 36 is in a natural state (i.e., its curvature equals the curvature ANG1), or when a force is applied to the opposite side of the elastic metal body 36 to the pressure sensor 34 so that the curvature of the elastic metal body 36 changes from the curvature ANG1 to a greater curvature, no external force is applied to the pressure sensor 34; thus, the sensor output of the pressure sensor 34 indicating the magnitude of the pressure applied to it is zero. In the process of causing the curvature of the elastic metal body 36 from curvature ANG1 to zero, an increasing external force is applied to the pressure sensor 34 first, and then the pressure sensor 34 applies the external force to the elastic metal body 36 to counteract the elastic force of the elastic metal body 36 so that the curvature of the elastic metal body 36 gradually changes from curvature ANG1 to zero. As a gradually increasing external force is applied to the pressure sensor 34, the sensor output of the pressure sensor 34 increases gradually.

Figure 1D:
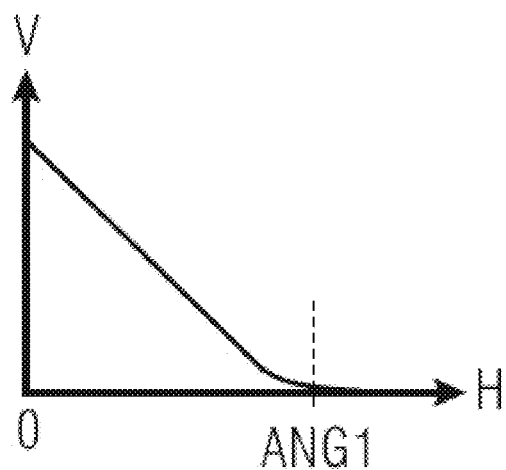
FIG. 1D shows an example of the output characteristic of a pressure sensor.

FIG. 1D shows an example of the output characteristic of the pressure sensor 24. As can be seen from FIG. 1D, in the curvature change interval of elastic metal body 36 from zero to curvature ANG1, the sensor output of the pressure sensor 34 indicating the magnitude of the pressure applied to it linearly decreases as the curvature of the elastic metal body 36 increases, and the relationship between the sensor output of the pressure sensor 34 and the curvature of the elastic metal body 36 is linear. In contrast, in the curvature change interval of the elastic metal body 36 larger than ANG1, the sensor output of the pressure sensor 34 is always equal to zero, and the relationship between the sensor output of the pressure sensor 34 and the curvature of the elastic metal body 36 is nonlinear. It can be seen that when the curvature of the elastic metal body 36 is small, the relationship between the sensor output of the pressure sensor 34 and the curvature of the elastic metal body 36 is linear. This means that the pressure sensor 34 can linearly convert a curvature of the elastic metal body 36 to a sensor output, so that the pressure sensor 34 can accurately measure the curvature of a finger bent together with the elastic metal body 36.

In order for the sensing apparatus 30 to linearly convert a curvature of a finger to its sensor output in the whole curvature change interval of the finger, it is preferable to make the curvature ANG1 not smaller than the curvature P1.

The controller 40 can combine the sensor output of the resistive strain gauge sensor 32 and the sensor output of the pressure sensor 34 provided in each sensing apparatus 30 to calculate a curvature of the finger for the purpose of which which each sensing apparatus 30 is directed. For example, but not limited thereto, the curvature of a finger to which each sensing apparatus 30 is directed can be calculated using a weighted sum of the sensor output of the resistive strain gauge sensor 32 and the sensor output of the pressure sensor 34 provided in each sensing apparatus 30.

In another example, but not limited thereto, when a curvature of the finger to which each sensing apparatus 30 is directed is small, the curvature of the finger to which each sensing apparatus 30 is directed can be calculated according to the sensor output of the pressure sensor 34 provided in each sensing apparatus 30, and when a curvature of the finger to which each sensing apparatus 30 is directed is large, the curvature of the finger to which each sensing apparatus 30 is directed can be calculated according to the sensor output of the resistive strain gauge sensor 32 provided in each sensing apparatus 30.

By way of the sensing apparatus 30, the curvature measurement apparatus 10 can linearly convert a curvature of a finger to a sensor output over the entire curvature change interval of the finger. However, when the curvature measurement apparatus 10 is worn on fingers of different persons or on different finger parts of the same person via the finger sheath 20, the curvature measurement apparatus 10 may generate different sensor outputs for the curvature of the same finger, which will result in failure of a robot hand to follow a human gesture accurately. The controller 40 may perform a calibration operation on the sensing apparatus 30 so that the robot hand can follow the human hand accurately even when the curvature measurement apparatus 10 is worn on fingers of different persons or on different finger parts of the same person. In this calibration operation, when a person wears the curvature measurement apparatus 10, the controller 40 instructs the person to fold (with the maximum bending) and unfold his/her fingers (with the minimum bending) once.

The controller 40 calculates the maximum curvature of the fingers for the purpose of which each sensing apparatus 30 is directed by using the sensor output of the resistive strain gauge sensor 32 and the sensor output of the pressure sensor 34 provided in each sensing apparatus 30 when the person's fingers are folded, and the controller 40 calculates the minimum curvature of the fingers of the person to whom each sensing apparatus 30 is directed by using the sensor output of the resistive strain gauge sensor 32 and the sensor output of the pressure sensor 34 provided in each sensing apparatus 30 when the person's fingers are unfolded. The controller 40 transmits the calculated maximum and minimum curvatures of each finger to the robot hand; the robot hand maps the maximum and minimum curvatures of each finger to the maximum and minimum curvatures of the corresponding finger, respectively, so that the robot hand can accurately follow the gesture of the person.

The curvature measurement apparatus 10 may further comprise a battery (not shown) for providing working power to the sensing apparatus 30 and the controller 40.

Figure 2:
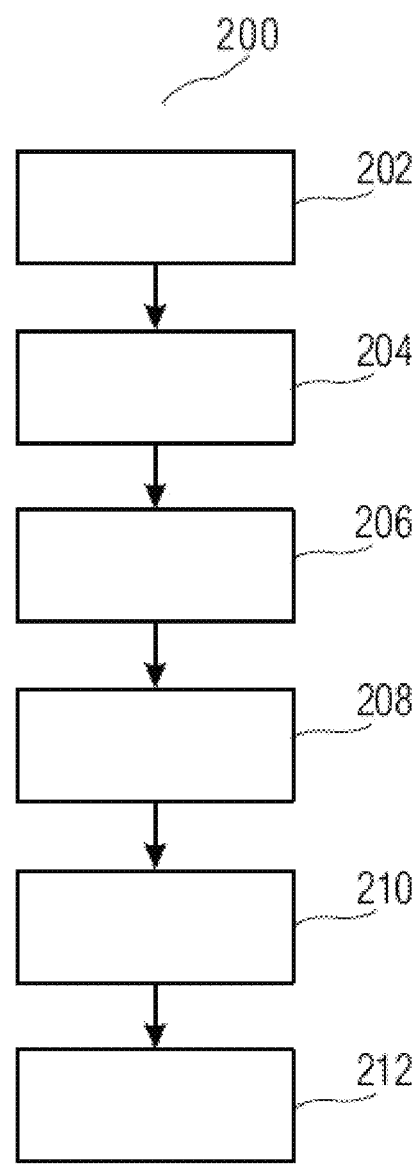
FIG. 2 shows an overall flowchart of a method for measuring a curvature of an object according to an embodiment of the present invention.

In reference to FIG. 2, said figure shows an overall flowchart of a method for measuring a curvature of an object according to an embodiment of the present invention. Next, referring to the curvature measurement apparatus 10 shown in FIG. 1A, the method 200 shown in FIG. 2 is described in detail.

As shown in FIG. 2, at block 202, an instruction is given to start performing a calibration operation. In other words, when a person wears the finger sheath 20 of the curvature measurement apparatus 10 on his/her finger, the controller 40 of the curvature measurement apparatus 10 instructs the person to fold his/her fingers (the fingers are in the maximum bending state) and unfold his/her fingers (the fingers are in the minimum bending state) once, thereby starting the calibration operation.

At block 204, after the person has folded and unfolded his/her fingers once, the maximum curvature of the fingers is calculated. In other words, the maximum curvature of the fingers to which each sensing apparatus 30 is directed is calculated by using the sensor output of the resistive strain gauge sensor 32 and the sensor output of the pressure sensor 34 provided in the sensing apparatus 30 when the person folds his/her fingers. Here, for example, but not limited thereto, the maximum curvature of the fingers to which each sensing apparatus 30 is directed may be calculated according to a weighted sum of the sensor output of the resistive strain gauge sensor 32 and the sensor output of the pressure sensor 34 provided in each sensing apparatus 30; alternatively, the curvatures of the fingers to which each sensing apparatus 30 is directed are calculated according to the sensor output of the resistive strain gauge sensor 32 provided in each sensing apparatus 30.

At block 206, the minimum curvature of the fingers is calculated. In other words, the controller 40 calculates the minimum curvature of the fingers to which each sensing apparatus 30 is directed using the sensor output of the resistive strain sensor 32 and the sensor output of the pressure sensor 34 provided in the sensor apparatus 30 when the person's fingers are unfolded. Here, for example, but not limited thereto, the maximum curvature of the fingers to which each sensing apparatus 30 is directed can be calculated according to a weighted sum of the sensor output of the resistive strain gauge sensor 32 and the sensor output of the pressure sensor 34 provided in each sensing apparatus 30; alternatively, the curvatures of the fingers to which each sensing apparatus 30 is directed are calculated according to the sensor output of the pressure sensor 34 provided in each sensing apparatus 30.

At block 208, the maximum and minimum curvatures are output; in other words, the controller 40 outputs the calculated maximum and minimum curvatures of each finger to the robot hand. The robot hand maps the maximum curvature and the minimum curvature of each finger from controller 40 to the maximum curvature and the minimum curvature of the corresponding finger, respectively, thereby accurately following the person's gesture.

The operations at blocks 202 to 208 form a calibration operation.

At block 210, the curvature of the finger is calculated; in other words, the curvatures of the fingers to which each sensing apparatus 30 is directed are calculated by the controller 40 using the sensor output of the resistive strain gauge sensor 32 and the sensor output of the pressure sensor 34 provided in each sensing apparatus 30 whenever sensor outputs are received from the resistive strain gauge sensor 32 and the pressure sensor 34 provided in each sensing apparatus 30. For example, but not limited thereto, the curvature of a finger to which each sensing apparatus 30 is directed can be calculated using a weighted sum of the sensor output of the resistive strain gauge sensor 32 and the sensor output of the pressure sensor 34 provided in each sensing apparatus 30. In the case of another example, but not limited thereto, when a curvature of the finger to which each sensing apparatus 30 is directed is small, the curvature of the finger to for which each sensing apparatus 30 is directed can be calculated according to the sensor output of the pressure sensor 34 provided in each sensing apparatus 30, and when a curvature of the finger to which each sensing apparatus 30 is directed is large, the curvature of the finger to which each sensing apparatus 30 is directed can be calculated according to the sensor output of the resistive strain gauge sensor 32 provided in each sensing apparatus 30.

At block 212, the curvature of the fingers is output; that is, the controller 40 outputs the calculated curvature of each finger to the robot hand.

Other Variants

It will be appreciated by those of ordinary skill in the art that, although in the above embodiments the pressure sensor 34 is attached to an elastic metal body 36, embodiments of the present invention are not limited thereto. In some other embodiments of the present invention, the pressure sensor 34 may also be attached to a metal component other than an elastic metal body.

It should be appreciated by those of ordinary skill in the art that, although in the above embodiments the sensor capable of linearly converting a curvature of a finger to a sensor output when the curvature of the finger is small is the pressure sensor 34 attached to the side of the bent end of a flexible metal body bent in a natural state that is to be pressed against the finger, embodiments of the present invention are not limited thereto. In some other embodiments of the present invention, a sensor capable of linearly converting a curvature of a finger to a sensor output when the curvature of the finger is small may also be a sensor achieved in another way.

It should be appreciated by those of ordinary skill in the art that, although in the above embodiments each sensing apparatus 30 comprises only one sensor capable of linearly converting a curvature of a finger to a sensor output when the curvature of the finger is small (i.e., the pressure sensor 34 attached to the side of the bent end of a flexible metal body bent in a natural state that is to be pressed against the finger), embodiments of the present invention are not limited thereto. In some other embodiments of the present invention, each sensing apparatus 30 may further comprise a plurality of sensors capable of linearly converting a curvature of a finger to a sensor output when the curvature of the finger is small, and the plurality of sensors may be of the same type or different types.

It should be appreciated by those of ordinary skill in the art that, although in the above embodiments each sensing apparatus 30 comprises only one sensor capable of linearly converting a curvature of a finger to a sensor output when the curvature of the finger is large (i.e., the resistive strain gauge sensor 32), embodiments of the present invention are not limited thereto. In some other embodiments of the present invention, each sensing apparatus 30 may further comprise a plurality of sensors capable of linearly converting a curvature of a finger to a sensor output when the curvature of the finger is large, and the plurality of sensors may be of the same type or different types.

It should be appreciated by those of ordinary skill in the art that, although in the above embodiments the calibration operation performed by the controller 40 is to calculate a curvature of a finger when the finger reaches its maximum curvature when the fingers fold and the curvature of the finger when the finger reaches its minimum curvature when the fingers unfold, respectively, and output them to the robot hand as the maximum curvature and the minimum curvature of the fingers, embodiments of the present invention are not limited thereto.

In some other embodiments of the present invention, for example, when a person expects to use the small curvature change interval of his/her fingers to achieve the large curvature change interval of a robot hand, the calibration operation performed by the controller 40 may also be: first, a person folds his/her finger to the maximum extent in the desired curvature change interval of the finger so that it is in the bending state F1 (a finger in the bending state F1 has a curvature greater than the minimum curvature of the finger and smaller than the maximum curvature of the finger) and unfolds his finger to the maximum extent in the bending state F2 (a finger in the bending state F2 has a curvature greater than the curvature of the finger in the bending state F1 and smaller than the maximum curvature of the finger); then, the controller 40 calculates the curvature of each finger in the bending state F1 and the curvature of each finger in the bending state F2 as the maximum curvature and the minimum curvature of each finger respectively, and outputs them to the robot hand.

It will be appreciated by those of ordinary skill in the art that, although in the above embodiments the controller 40 needs to perform a calibration operation to enable the robot hand to follow a human gesture accurately, embodiments of the present invention are not limited thereto. In some other embodiments of the present invention, the controller 40 may also not need to perform a calibration operation, for example, in a case where other measures are already in place to ensure that the robot hand can accurately follow a human gesture.

It will be appreciated by those of ordinary skill in the art that, although in the above embodiments the curvature measurement apparatus 10 comprises a plurality of finger sheaths 20 and a plurality of sensing apparatuses 30, embodiments of the present invention are not limited thereto. In some other embodiments of the present invention, the curvature measurement apparatus 10 may further comprise only a finger sheath 20 and a sensing apparatus 30 attached to the inner wall of the finger sheath 20.

It will be appreciated by those of ordinary skill in the art that, although in the above embodiments the curvature measurement apparatus 10 comprises one or more finger sheaths 20 such that the sensing apparatus 30 can sense subtle gesture changes of a finger of a person so as to accurately measure a curvature of the human finger, embodiments of the present invention are not limited thereto. In some other embodiments of the present invention, the curvature measurement apparatus 10 can also comprise no finger sheath 20.

It will be appreciated by those of ordinary skill in the art that, although in the above embodiments the curvature measurement apparatus 10 is suitable for measuring a curvature of a finger of a person, embodiments of the present invention are not limited thereto. In some other embodiments of the present invention, the curvature measurement apparatus 10 is also applicable to measuring a curvature of an object other than a finger of a person (for example, but not limited to, an arm of a person, or a finger or an arm of an animal).

It will be appreciated by those of ordinary skill in the art that, although in the above embodiments the curvature measurement apparatus 10 comprises a battery for providing working power to the sensing apparatus 30 and the controller 40, embodiments of the present invention are not limited thereto. In some other embodiments of the present invention, the curvature measurement apparatus 10 may comprise no batteries, but may provide working power from an external power supply to the sensing apparatus 30 and the controller 40 of the curvature measurement apparatus 10.

Figure 3:
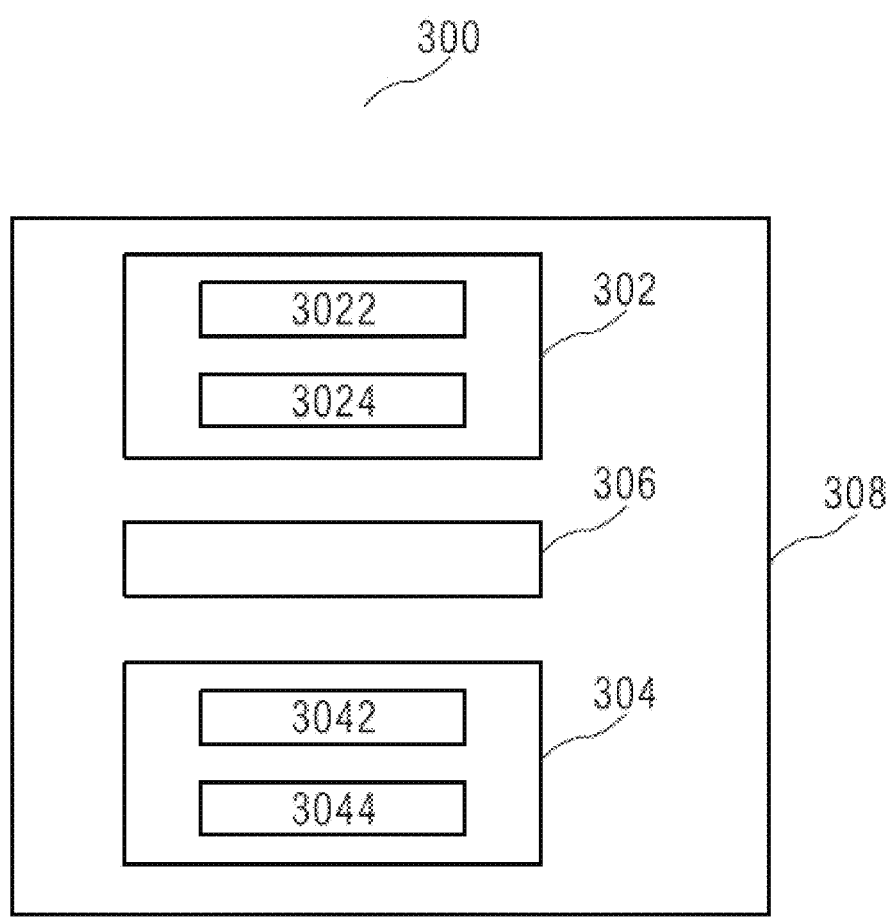
FIG. 3 shows a schematic diagram of a curvature measurement apparatus according to an embodiment of the present invention.

In reference to FIG. 3, said figure shows a schematic diagram of a curvature measurement apparatus according to an embodiment of the present invention. As shown in FIG. 3, the curvature measurement apparatus 300 may comprise a first curvature measurement unit 302 and a second curvature measurement unit 304. The first curvature measurement unit 302 is configured to, when a curvature of an object to be measured is greater than a first curvature, measure the curvature of the object to be measured. The second curvature measurement unit 304 is configured to, when the curvature of the object to be measured is smaller than a second curvature, measure the curvature of the object to be measured, wherein the second curvature is greater than or equal to the first curvature.

In the first aspect, the first curvature measurement unit 302 may comprise a resistive strain gauge sensor 3022 and a first curvature calculation unit 3024. The resistive strain gauge sensor 3022 is configured to have a shape extending along the object to be measured, and when the curvature of the object to be measured is greater than the first curvature, the resistive strain gauge sensor 3022 bends as the object to be measured bends, to change a resistance of the resistive strain gauge sensor 3022. The first curvature calculation unit 3024 is configured to calculate the curvature of the resistive strain gauge sensor 3022 according to the resistance of the resistive strain gauge sensor 3022, to use the curvature as the curvature of the object to be measured. For example, the resistive strain gauge sensor 3022 may be achieved by the resistive strain gauge sensor 32, and the first curvature calculation unit 3024 may be achieved by the controller 40.

In a second aspect, the second curvature measurement unit 304 may comprise a pressure sensor 3042 and a second curvature calculation unit 3044. The pressure sensor 3042 is configured to come into contact with the object to be measured; when the curvature of the object to be measured is smaller than the second curvature, the pressure sensor 3042 senses a pressure applied by the object to be measured to the pressure sensor 3042 as the object to be measured bends. The second curvature calculation unit 3044 is configured to calculate the curvature of the object to be measured according to the pressure sensed by the pressure sensor 3042. For example, the pressure sensor 3042 may be achieved by the pressure sensor 34, and the second curvature calculation unit 3044 may be achieved by the controller 40.

In a third aspect, the curvature measurement apparatus 300 further comprises an elastic component 306, configured to have an original shape extending along the object to be measured and bending by a preset curvature, wherein the pressure sensor 3042 is disposed in a direction in which the object to be measured bends, and when the elastic component 306 bends and changes the original shape as the object to be measured bends, the elastic component 306 applies an elastic force to the object to be measured, so that the object to be measured applies to the pressure sensor 3042 a force corresponding to the elastic force applied by the elastic component 306. For example, the elastic component 306 can be achieved by the elastic metal body 36.

In a fourth aspect, the first curvature calculation unit 3024 calculates a curvature of the resistive strain gauge sensor 3022 according to a first relationship curve according to which the resistance of the resistive strain gauge sensor 3022 changes as the curvature changes; and the resistive strain gauge sensor 3022 is configured to cause a portion that is of the first relationship curve and that corresponds to the curvature of the resistive strain gauge sensor 3022 greater than the first curvature to be linear.

In a fifth aspect, the second curvature calculation unit 3044 calculates a curvature of the elastic component 306 according to a second relationship curve according to which the pressure sensed by the pressure sensor 3042 changes as the curvature of the elastic component 306 changes, to use the curvature as the curvature of the object to be measured; and the elastic component 306 is configured to cause a portion that is of the second relationship curve and that corresponds to the curvature of the elastic component 306 smaller than the second curvature to be linear.

In a sixth aspect, the preset curvature is the second curvature.

In a seventh aspect, the object to be measured is a finger of a person, and the curvature measurement apparatus 300 further comprises a sheath body 308 configured to be worn on the finger, wherein the first curvature measurement unit 302 and the second curvature measurement unit 304 are disposed in the sheath body 308. For example, the sheath body 308 can be achieved by the finger sheath 20.

An embodiment of the present invention further provides a machine-readable medium storing an executable instruction that, when executed by a processor, enables the processor to execute any of the above methods. Specifically, a system or apparatus can be provided that is equipped with a machine-readable medium storing a software program code for implementing the functions of any of the embodiments described above, and the computer or processor of the system or apparatus is caused to read out and execute a machine-readable instruction stored in the machine-readable medium.

In this case, the program code read from the machine-readable medium itself can implement the functions of any of the above embodiments, and therefore the machine-readable code and the machine-readable medium storing the machine-readable code form a portion of an embodiment of the present invention.

Examples of machine-readable media include floppy disk, hard disk, magneto-optical disk, optical disk (for example, CD-ROM, CD-R, CD-RW, DVD-ROM, DVD-RAM, DVD-RW, and DVD+RW), magnetic tape, non-volatile memory card, and ROM. Optionally, a program code can be downloaded from a server computer or a cloud via a communications network.

It should be noted that not all the steps and modules in the above-mentioned processes and system structure diagrams are necessary, and some steps or modules can be ignored according to actual needs. The execution sequence of each step is not fixed, and can be adjusted according to needs. The system structures described in the above embodiments may be either physical or logical. In other words, some modules may be achieved by the same physical entity, or some modules may be achieved by a plurality of physical entities or may be jointly achieved by some of the components in a plurality of independent devices.

In the above embodiments, a hardware unit can be achieved by mechanical or electrical device(s). For example, a hardware unit may comprise a permanent dedicated circuit or logic (for example, a dedicated processor, FPGA, or ASIC) to perform corresponding operations. A hardware unit may further comprise programmable logic or circuitry (for example, a general-purpose processor or any other programmable processor), which may be temporarily configured by software to perform corresponding operations. Specific implementations (mechanical, or dedicated permanent circuits, or temporarily configured circuits) can be determined on the basis of cost and time considerations.

While the present invention has been described and illustrated in detail above with reference to the drawings and preferred embodiments, the present invention is not limited to these disclosed embodiments, and more embodiments of the present invention can be obtained by combining the code auditing device(s) in the different embodiments described above, as can be appreciated by those of ordinary skill in the art based on the above-mentioned embodiments; these embodiments are also within the scope of the present invention.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A curvature measurement apparatus, comprising:
a first curvature measurement unit configured to, upon a curvature of an object to be measured being relatively greater than a first curvature, measure the curvature of the object to be measured; and
a second curvature measurement unit configured to, upon the curvature of the object to be measured being relatively smaller than a second curvature, measure the curvature of the object to be measured, wherein the second curvature is relatively greater than or equal to the first curvature, wherein the object to be measured is a finger of a person, and the apparatus further includes:
a sheath body, configured to be worn on the finger, wherein the first curvature measurement unit and the second curvature measurement unit are disposed in the sheath body.

2. The apparatus of claim 1, wherein the first curvature measurement unit comprises:
a resistive strain gauge sensor, having a shape extending along the object to be measured, wherein, upon the curvature of the object to be measured being relatively greater than the first curvature, the resistive strain gauge sensor is configured to bend as the object to be measured bends, to change a resistance of the resistive strain gauge sensor; and
a first curvature calculation unit, configured to calculate a curvature of the resistive strain gauge sensor according to the resistance of the resistive strain gauge sensor as changed, the curvature calculated being the curvature of the object measured.

3. The apparatus of claim 2, wherein the first curvature calculation unit is configured to calculate a curvature of the resistive strain gauge sensor according to a first relationship curve according to which, the resistance of the resistive strain gauge sensor is configured to change as the curvature changes; and
the resistive strain gauge sensor is configured to cause a portion, of a first relationship curve and corresponding to the curvature of the resistive strain gauge sensor relatively greater than the first curvature, to be linear.

4. The apparatus of claim 2, wherein the second curvature measurement unit comprises:
a pressure sensor, configured to come into contact with the object to be measured, wherein, upon the curvature of the object to be measured being relatively smaller than the second curvature, the pressure sensor is configured to sense a pressure, applied by the object to be measured to the pressure sensor, as the object to be measured bends; and a second curvature calculation unit, configured to calculate the curvature of the object to be measured according to the pressure sensed by the pressure sensor.

5. The apparatus of claim 1, wherein the second curvature measurement unit comprises:
a pressure sensor, configured to come into contact with the object to be measured, wherein, upon the curvature of the object to be measured being relatively smaller than the second curvature, the pressure sensor is configured to sense a pressure, applied by the object to be measured to the pressure sensor, as the object to be measured bends; and a second curvature calculation unit, configured to measure the curvature of the object according to the pressure sensed by the pressure sensor.

6. The apparatus of claim 5, further comprising:
an elastic component, configured to have an original shape extending along the object to be measured and configured to bend by a preset curvature, wherein
the pressure sensor is disposed in a direction in which the object to be measured bends, and upon the elastic component bending and changing the original shape as the object to be measured bends, the elastic component is configured to apply an elastic force to the object to be measured, so that a force corresponding to the elastic force applied by the elastic component is applied to the pressure sensor.

7. The apparatus of claim 6, wherein the second curvature calculation unit is configured to measure a curvature of the elastic component according to a second relationship curve, wherein the pressure, sensed by the pressure sensor, changes as the curvature of the elastic component changes, to use the curvature as the curvature of the object to be measured; and the elastic component being configured to cause a portion of the second relationship curve, corresponding to the curvature of the elastic component relatively smaller than the second curvature, to be linear.

8. The apparatus of claim 6, wherein the preset curvature is the second curvature.

9. A curvature measurement method, comprising:

comparing a curvature of an object to be measured to a first curvature;

measuring the curvature of the object upon the curvature of the object being relatively greater than the first curvature;

comparing the curvature of the object to be measured to a second curvature, the second curvature being relatively greater than or equal to the first curvature; and measuring the curvature of the object upon the curvature of the object being relatively smaller than the second curvature.

10. The curvature measurement method of claim 9, wherein the comparing of the curvature of the object to be measured to the first curvature comprises:

changing a resistance bending a sensor having a shape extending along the object to be measured, as the object to be measured bends, upon the curvature of the object to be measured being relatively greater than the first curvature; and calculating a curvature of the sensor, according to the resistance of the sensor as changed, the curvature calculated being the curvature of the object measured.

11. The curvature measurement method of claim 10, wherein the comparing of the curvature of the object to be measured to the second curvature comprises:

sensing a pressure via a pressure sensor, upon the curvature of the object to be measured being relatively smaller than the second curvature, applied to the pressure sensor as the object to be measured bends; and measuring the curvature of the object to be measured according to the pressure sensed by the pressure sensor.

12. The curvature measurement method of claim 9, wherein the comparing of the curvature of the object to be measured to the second curvature comprises:

sensing a pressure via a pressure sensor, upon the curvature of the object to be measured being relatively smaller than the second curvature, applied to the pressure sensor as the object to be measured bends; and measuring the curvature of the object to be measured according to the pressure sensed by the pressure sensor.

\* \* \* \* \*